United States Patent [19]

Faler et al.

[11] Patent Number: 4,912,189

[45] Date of Patent: Mar. 27, 1990

[54] SPIROBIINDANOL POLYSILOXANES

[75] Inventors: Gary R. Faler, Scotia; David M. Dardaris, Clifton Park, both of N.Y.

[73] Assignee: General Electric Company, Schenectady, N.Y.

[21] Appl. No.: 267,860

[22] Filed: Nov. 7, 1988

Related U.S. Application Data

[63] Continuation-in-part of Ser. No. 254,742, Oct. 7, 1988, Pat. No. 4,895,919.

[51] Int. Cl.$^4$ ............................................. C08G 77/06
[52] U.S. Cl. ...................................... 528/21; 528/25; 528/29; 556/462
[58] Field of Search .................... 556/462; 528/21, 25, 528/29

[56] References Cited

U.S. PATENT DOCUMENTS 3,821,325 6/1974 Merritt, Jr. et al. .
3,832,419 8/1974 Merritt, Jr. .
4,605,789 8/1986 Silvis et al. ........................ 568/721
4,672,102 6/1987 Silvis et al. ........................ 528/97

Primary Examiner—Melvyn I. Marquis
Assistant Examiner—Karen A. Hellender
Attorney, Agent, or Firm—William H. Pittman; James C. Davis, Jr.

[57] ABSTRACT

Spirobiindanol polydiorganosiloxane compounds are prepared by the reaction of an α, ω-dichloropolydiorganosiloxane with a spirobiindane bisphenol in the presence of an acid acceptor. They are useful as intermediates in the preparation of copolysiloxanecarbonates.

4 Claims, No Drawings

SPIROBIINDANOL POLYSILOXANES

This application is a continuation-in-part of copending application Ser. No. 254,742, filed Oct. 7, 1988 now U.S. Pat. No. 4,895,919. The disclosure of said application is incorporated by reference herein.

This invention relates to intermediates useful in the preparation of copolycarbonates having low orientational birefringence and favorable processing properties.

Polycarbonates, being transparent, are in wide use for the manufacture of optical disks. For the most part, use of such disks has hitherto been limited to applications in which recording of data in permanent form is acceptable, such as for sound recording and ROM memory for computers. It is of increasing interest to develop optical disks which may be erased and on which new data may be recorded.

Data on optical disks are read by a plane polarized laser beam, associated with a similar reference beam polarized in a perpendicular direction. For accurate reading, it is necessary to minimize phase retardation of these laser beams upon passage through the disk. One factor directly affecting retardation is birefringence; i.e., the difference between indices of refraction of light polarized in two directions perpendicular to each other.

Birefringence has several components, caused by such factors as molecular structure and degree of molecular orientation. "Orientational" birefringence of a polymer, ideally measured after perfect orientation of all polymer molecules by stretching, is a function solely of molecular structure. Approximate measurements of orientational birefringence of several polymers, for the purpose of comparison, may be made on samples which have been injection molded under substantially identical conditions.

In the aforementioned application Ser. No. 254,742, now U.S. Pat. No. 4,895,919, there are disclosed copolysiloxanecarbonate compositions comprising structural units of the formulas

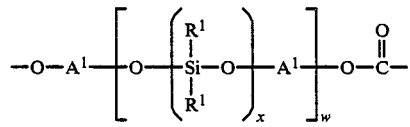   (I)

and

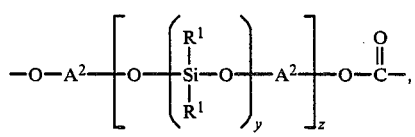   (II)

wherein:
$A^1$ is

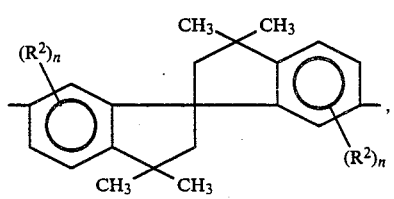   (III)

$A^2$ is

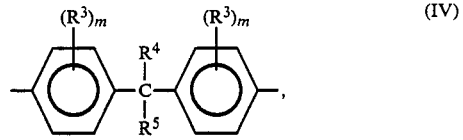   (IV)

$R^1$ is a hydrocarbon radical, each of $R^2$ and $R^3$ is independently $C_{1-4}$ alkyl or halo, each of $R^4$ and $R^5$ is independently $C_{1-4}$ alkyl or phenyl, m is 0–4, n is 0–3, each of x and y has an average value of about 0–200 and the average value of $x+y$ is at least about 5, w is 0 when x is 0 and at least 1 when x is greater than 0, and z is 0 when y is 0 and at least 1 when y is greater than 0; at least one of W and z being 1 or greater. Also disclosed therein are methods for preparing said copolysiloxanecarbonate compositions.

For the preparation of such compositions containing high proportions of spirobiindane moiety-containing units coupled with high proportions of polydiorganosiloxane units, it is necessary to employ reactants in which both of said units are present. Such reactants are provided by the present invention.

Thus, the invention is spirobiindanol polydiorganosiloxane compounds of the formula

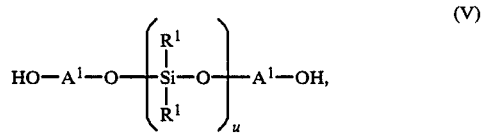   (V)

wherein $A^1$, $R^1$, $R^2$ and an are as previously defined and u has an average value of about 5–200.

The $A^1$ units in the spirobiindanol polydiorganosiloxane compounds of this invention are derived from various spirobiindane bisphenols, particularly 6,6'-dihydroxy-3,3,3',3'-tetramethyl-1,1'-spiro(bis)indane (hereinafter "SBI"). They may also be derived from various alkyl or halo-substituted analogs of SBI, especially those in which n is 1 or 2 and $R^2$ is methyl, chloro or bromo. The preferred bisphenol is SBI, in which n is 0.

The compounds of the invention further contain polydiorganosiloxane moieties, in which $R^1$ may be an aliphatic, alicyclic or aromatic hydrocarbon radical. It is most often a $C_{1-4}$ alkyl radical, preferably methyl. The average value of u is about 5–200 and preferably at least about 10.

The compounds of this invention may be prepared by the reaction of an $\alpha,\omega$-dichloropolydiorganosiloxane with a spirobiindane bisphenol in the presence of an acid acceptor, typically an amine and preferably a tertiary amine such as triethylamine. Their preparation is illustrated by the following example. The size of polydiorganosiloxane blocks, whenever specified herein, was determined by Si-29 nuclear magnetic resonance spectroscopy.

EXAMPLE 1

To a mixture of 200 ml. of methylene chloride, 12.61 grams (40.9 mmol.) of anhydrous SBI And 11.5 ml. (81.8 mmol.) of triethylamine was added dropwise over 10 minutes, with stirring, 49.66 grams (20.5 mmol.) of an $\alpha,\omega$-dichloropolydimethylsiloxane having an average of 32 dimethylsiloxane units. The mixture was heated under reflux for 20 minutes, cooled and acidified with aqueous hydrochloric acid solution. The organic phase was separated, washed three times with water and dried over magnesium sulfate. Upon vacuum evaporation of the methylene chloride, the desired spirobiindanol-terminated polydimethylsiloxane was obtained as a clear liquid.

As previously noted, the spirobiindanol polydiorganosiloxanes of this invention may be converted to spirobiindane copolysiloxanecarbonates. This may be achieved by effecting reaction between a carbonate precursor, at least one spirobiindanol polydiorganosiloxane, and at least one corresponding bisphenol-derived compound. The preferred carbonate precursor is phosgene.

The preparation of copolysiloxanecarbonates from the spirobiindanol polydiorganosiloxane compounds of this invention is illustrated by the following examples. Molecular weights are weight average and were determined by gel permeation chromatography relative to polystyrene. Proportions of structural units and moieties were calculated from the stoichiometry.

EXAMPLE 2

A mixture of 10.4 grams (33.9 mmol.) of SBI, 3.3 grams (14.5 mmol.) of bisphenol A, 1 ml. of a 0.25 M solution of p-cumylphenol in methylene chloride, 100 ml. of methylene chloride and 75 ml. of water was adjusted to a pH in the range of 9-10 by the addition of 50% aqueous sodium hydroxide solution. Phosgene was introduced at 0.495 gram per minute for 20 minutes (total 100 mmol.), while the pH was maintained in the same range. There were then added 4.78 grams (1.61 mmol.) of the product of Example 1 and 2 ml. of a 0.25 M solution of triethylamine in methylene chloride, and the mixture was stirred for 5 minutes in the same pH range. An additional charge of 2.48 grams (25 mmol.) of phosgene was added over 5 minutes, after which the solution was purged with nitrogen and diluted with methylene chloride.

The organic phase was separated and washed with dilute aqueous hydrochloric acid and water, and the copolysiloxanecarbonate was precipitated by pouring into methanol, filtered and dried in a vacuum oven. It had a molecular weight of 114,100, contained 71% of units of formula I and had a ratio of polydimethylsiloxane to bisphenol moieties of 1:1.

EXAMPLE 3

Following the procedure of Example 2, a copolysiloxanecarbonate was prepared from 2.89 moles of SBI, 1.56 moles of bisphenol A, 25 mmol. of p-cumylphenol and 556 mmol. of a spirobiindanol-terminated polydimethylsiloxane similar to that of Example 1 but containing an average of 10 dimethylsiloxane units per molecule. It had a molecular weight of about 143,000, contained 69% of units of formula I and had a ratio of polydimethylsiloxane to bisphenol moieties of 1:1.

The copolysiloxanecarbonates prepared from the spirobiindanol polydiorganosiloxane compounds of this invention are characterized by such properties as high ductility, low processing temperature and low orientational birefringence. High ductility is demonstrated by high tensile elongation, and low processing temperature by a relatively low glass transition temperature (Tg), when compared with a corresponding SBI-bisphenol A copolycarbonate containing no diorganosiloxane moieties. In addition, the product of Example 3 has a V-O flame retardancy rating.

In the following table, various properties of the copolysiloxanecarbonates of Examples 2-3, after extrusion and pelletization, are listed. The molecular weights of said products are lower than those given in the examples hereinabove because of degradation during the extrusionpelletization process. The control was a copolycarbonate free from diorganosiloxane units and consisting of 71% SBI carbonate and 29% bisphenol A carbonate units. Intrinsic viscosities were determined in methylene chloride at 25° C.

|  | Example | | Control |
|---|---|---|---|
|  | 2 | 3 | |
| Mw | 122,000 | 94,000 | 118,000 |
| Intrinsic viscosity, dl./g. | 0.65 | 0.54 | 0.72 |
| Tg, °C. | 204 | 164 | 210 |
| Orientational birefringence × 10³ | 0.6 | 0.08 | 1.4 |
| Tensile strength, MPa.: | | | |
| At yield | 49.9 | 43.8 | — |
| At break | 46.8 | 30.1 | 70.2 |
| Tensile elongation, % | 15 | 55 | 0 |

In addition to the foregoing properties, said copolysiloxanecarbonates can be molded into articles which do not undergo the stress cracking characteristic of ordinary SBI bisphenol A copolycarbonates.

What is claimed is:

1. A spirobiindanol polydiorganosiloxane compound of the formula

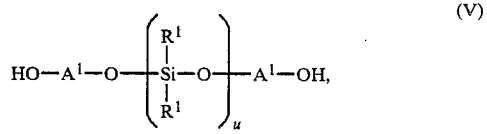

wherein $A^1$ is

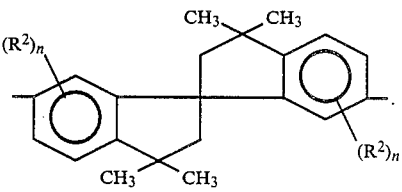

$R^1$ is a hydrocarbon radical, $R^2$ is $C_{1-4}$ alkyl or halo, n is 0-3 and u has an average value of about 5-200.

2. A compound according to claim 1 wherein n is 0.

3. A compound according to claim 2 wherein $R^1$ is methyl.

4. A compound according to claim 3 wherein u is at least about 10.